United States Patent
Sato et al.

(10) Patent No.: US 6,922,310 B2
(45) Date of Patent: Jul. 26, 2005

(54) ROTARY HEAD APPARATUS WITH MAGNETIC HEAD HAVING CONVEX CURVE AND MAGNETIC PLAYBACK APPARATUS USING THE SAME

(75) Inventors: Hiroyuki Sato, Niigata-ken (JP); Tomoaki Omomo, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 100 days.

(21) Appl. No.: 10/679,125

(22) Filed: Oct. 3, 2003

(65) Prior Publication Data

US 2004/0070868 A1 Apr. 15, 2004

(30) Foreign Application Priority Data

Oct. 15, 2002 (JP) .......................................... 2002-299890

(51) Int. Cl.$^7$ ............................................. G11B 5/187
(52) U.S. Cl. ....................................................... 360/122
(58) Field of Search .................. 360/122, 130.21–130.23

(56) References Cited

U.S. PATENT DOCUMENTS 4,163,267 A * 7/1979 DeMoss ..................... 360/224
4,706,146 A    11/1987 Dohmen et al.
6,023,396 A     2/2000 Chun et al.

FOREIGN PATENT DOCUMENTS

JP            8-30915         2/1996

* cited by examiner

*Primary Examiner*—A. J. Heinz
(74) *Attorney, Agent, or Firm*—Brinks Hofer Gilson & Lione (57) ABSTRACT

A rotary head apparatus includes a rotary drum having two magnetic heads mounted thereon. Each magnetic head has a recording-medium opposing surface curved in two convex shapes extending towards the outside of the drum, one along the longitudinal cross section of the magnetic head extending across the centerline laterally dividing the magnetic head into two parts so as to be orthogonal to the sliding direction of the recording medium, and the other along the lateral cross section orthogonal to the centerline. The apex of the lateral cross section is gradually displaced from the centerline as distancing itself from the center of the surface in the longitudinal direction and in the opposite direction to the above displacement as distancing itself from the center in the reverse longitudinal direction. Each displacement of the apex laterally away from the centerline in a sliding area of the recording medium is at most 2 μm.

4 Claims, 10 Drawing Sheets

| LENGTH OF OPPOSING SURFACE | MEASURED POSITION | | | | | | | | | | |
|---|---|---|---|---|---|---|---|---|---|---|---|
| | -500μm | -400μm | -300μm | -200μm | -100μm | MAGNETIC GAP POSITION | +100μm | +200μm | +300μm | +400μm | +500μm |
| Rch: 789μm | | | -3.0 | -1.8 | -0.6 | 0.0 | 0.0 | 2.2 | 4.4 | | |
| Rch: 862μm | | | -1.2 | -0.8 | 0.0 | 0.0 | 0.0 | 0.8 | 2.0 | | |
| Rch: 909μm | | -4.0 | -1.6 | 0.0 | 0.0 | 0.0 | 0.0 | 0.8 | 1.6 | 4.0 | |
| Rch: 976μm | | -3.0 | -1.6 | 0.0 | 0.0 | 0.0 | 0.0 | 0.6 | 1.6 | 2.6 | |
| Rch: 1131μm | -3.6 | -1.1 | 0.0 | 0.0 | 0.0 | 0.0 | 0.0 | 0.4 | 1.0 | 2.4 | 4.2 |
| Lch: 785μm | | | 3.2 | 2.0 | 0.5 | 0.0 | -0.4 | -1.6 | -3.8 | | |
| Lch: 851μm | | | 2.4 | 1.2 | 0.6 | 0.0 | -0.6 | -1.4 | -2.4 | | |
| Lch: 902μm | | 3.0 | 1.6 | 0.0 | 0.0 | 0.0 | 0.0 | -0.4 | -1.8 | -2.4 | |
| Lch: 989μm | | 2.0 | 0.6 | 0.0 | 0.0 | 0.0 | 0.0 | 0.0 | -1.0 | -1.4 | |
| Lch: 1131μm | 4.0 | 0.8 | 0.0 | 0.0 | 0.0 | 0.0 | 0.0 | 0.0 | -0.3 | -0.8 | -1.8 |

UNIT (μm)

ROTARY HEAD APPARATUS WITH MAGNETIC HEAD HAVING CONVEX CURVE AND MAGNETIC PLAYBACK APPARATUS USING THE SAME

BACKGROUND OF THE INVENTION

1. Field of the Invention

The present invention relates to a rotary head apparatus including at least one magnetic head and a magnetic playback apparatus using the same, and more particularly, the present invention relates to a rotary head which includes at least one magnetic head, with which a recording medium is unlikely scraped, and which prevents a decrease in output and deterioration in an error-detection characteristic due to a spacing loss caused by a deposition produced when the recording medium is scraped, and also relates to a magnetic playback apparatus using the same.

2. Description of the Related Art

In some of magnetic recording and playback apparatuses for use in video equipment or for saving computer data, a rotary head apparatus includes a rotary drum having at least one magnetic head mounted thereon, and when a magnetic tape runs while keeping in contact with the rotary drum along a helical trajectory, and the rotary drum rotates, data is recorded into and played back from the magnetic tape by the helical scanning method.

Figure 8:
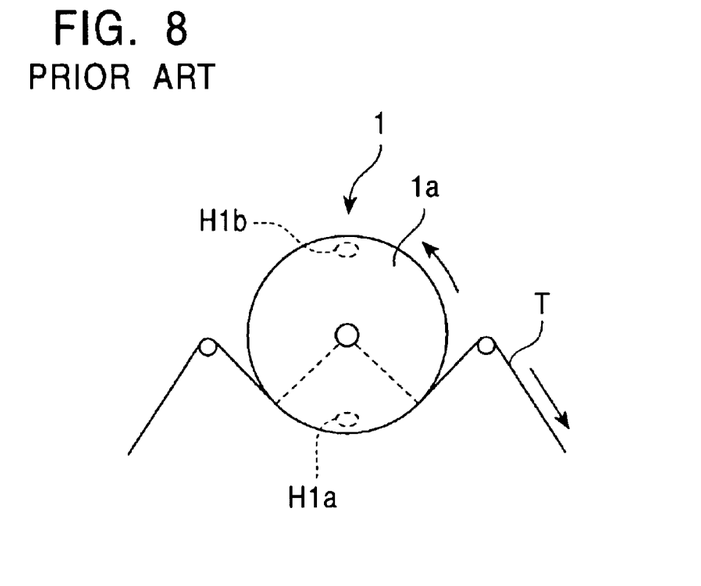
FIG. 8 is a plan view of a known rotary head apparatus.
Figure 9:
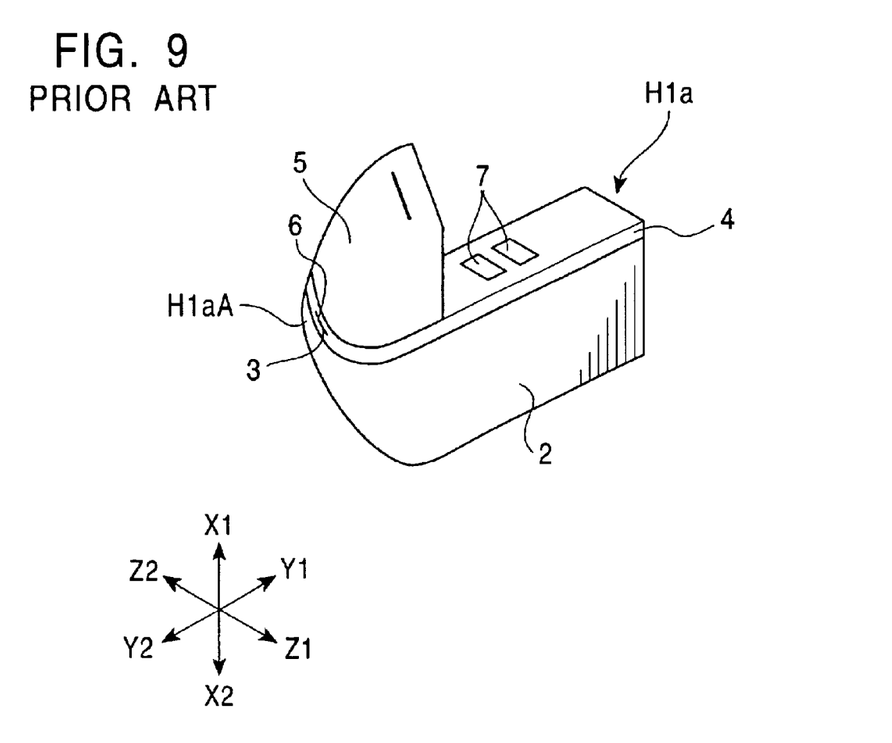
FIG. 9 is a perspective view of an example magnetic head mounted on the rotary head apparatus shown in FIG. 8.
Figure 10A:
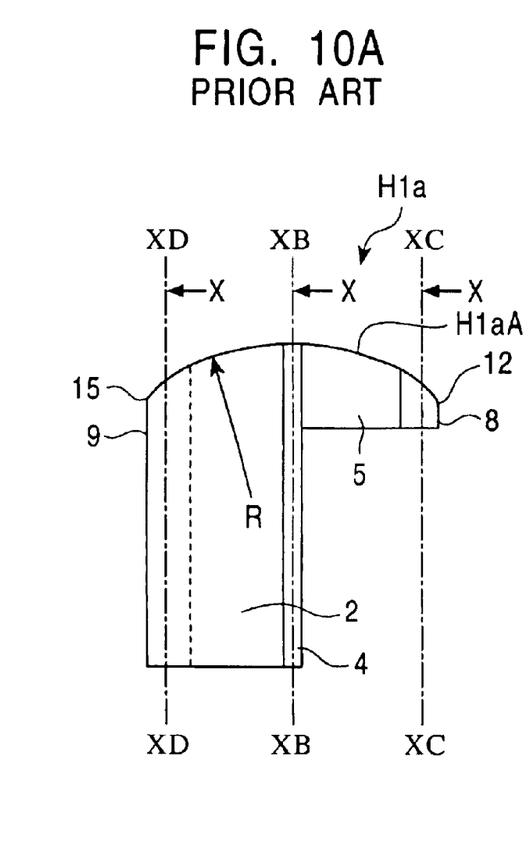
FIG. 10A is a plan view of the magnetic head shown in FIG. 8, viewed from the Z1 direction indicated in FIG. 9 and rotated clockwise by 90 degrees.
Figure 10B:
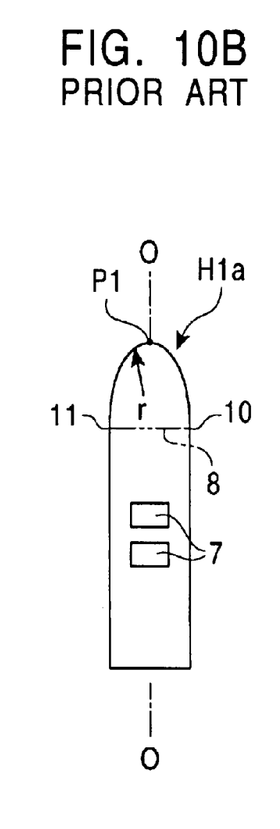
FIGS. 10B to 10D are illustrations respectively taken along the lines XB—XB, XC—XC, and XD—XD and viewed from the arrow X indicated in FIG. 10A.
Figure 10C:
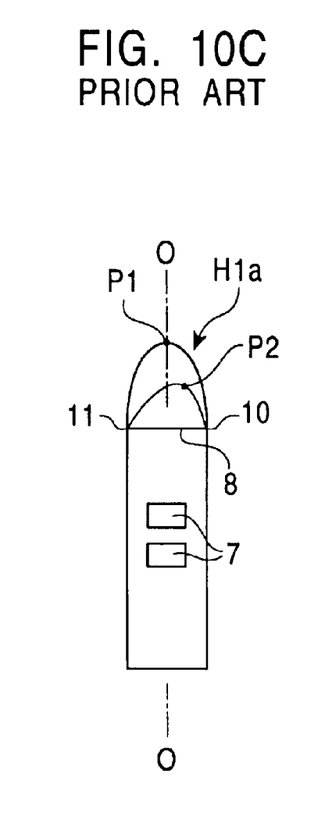
Figure 10D:
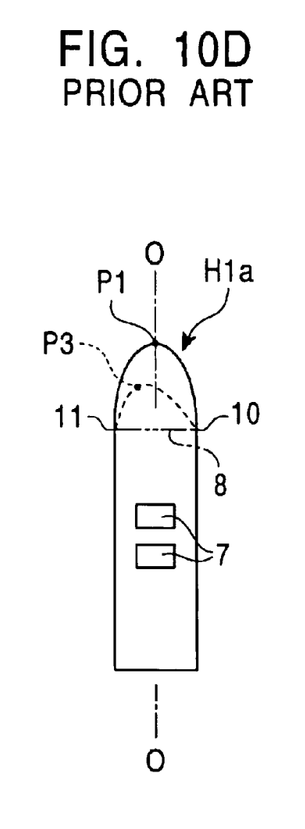
Figure 11:
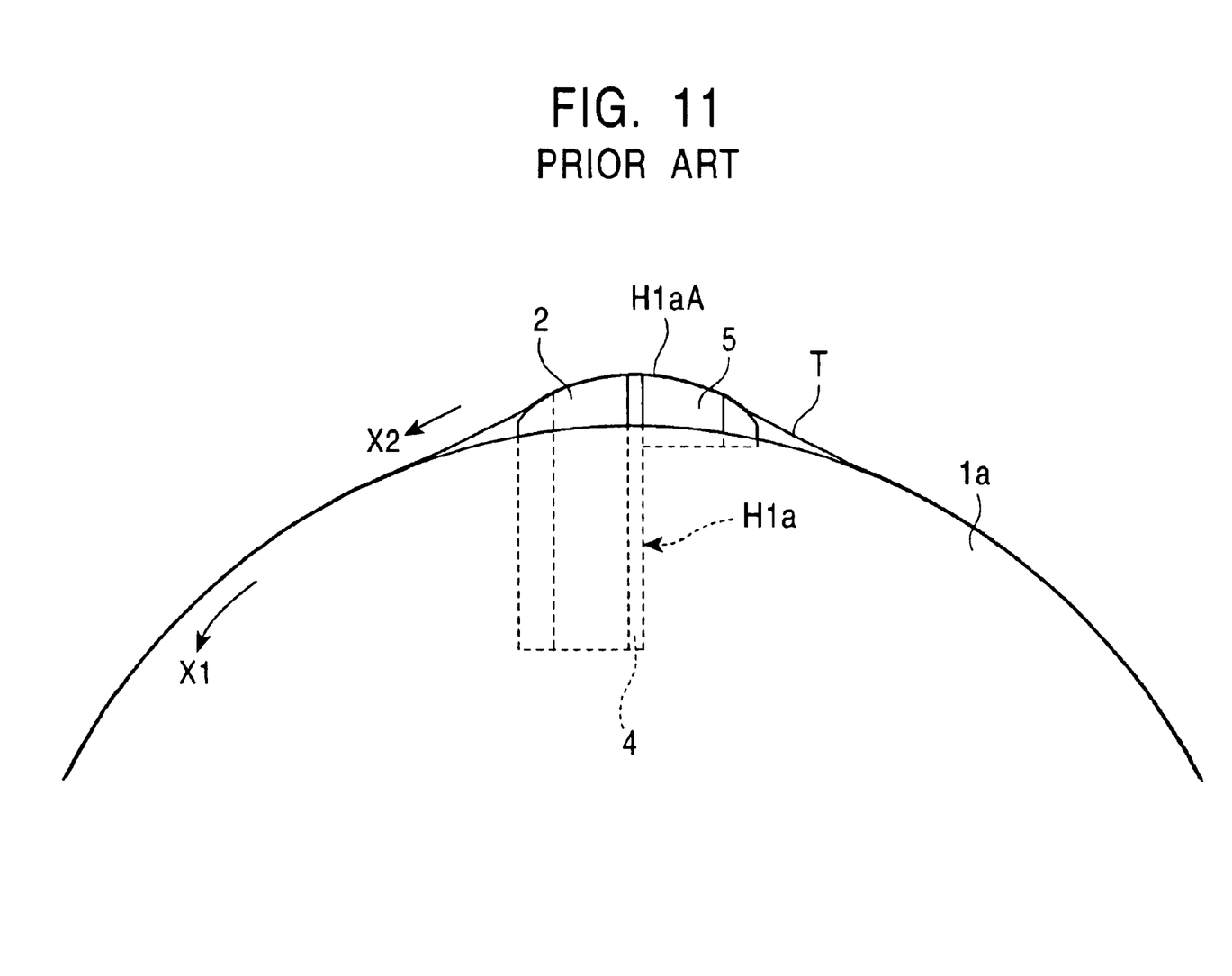
FIG. 11 is a partially magnified view illustrating a state in which a magnetic tape lies in contact with the rotary head apparatus shown in FIG. 8.
Figure 12:
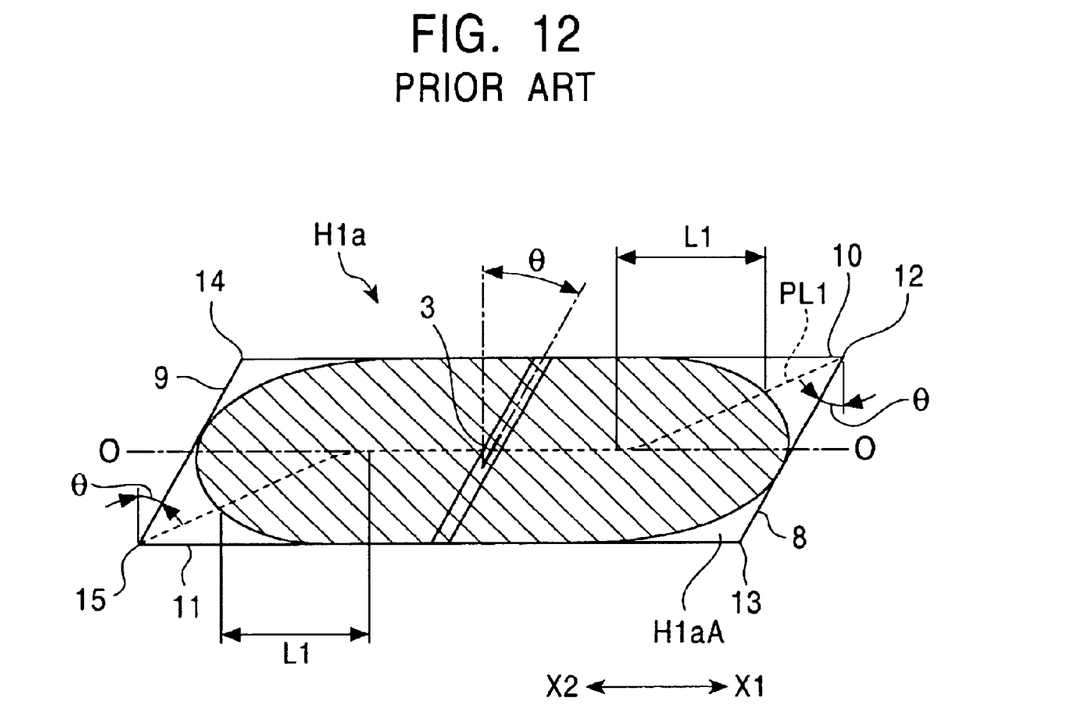
FIG. 12 is a plan view of the magnetic head shown in FIG. 9 and viewed from the Y2 direction indicated in FIG. 9.

FIG. 8 is a plan view of a rotary head apparatus having magnetic heads mounted thereon and disposed in a magnetic recording and playback apparatus. FIG. 9 is a perspective view of an example magnetic head mounted on the rotary head apparatus. FIG. 10A is a plan view of the magnetic head shown in FIG. 9, and viewed from the Z1 direction indicated in FIG. 9 and rotated clockwise by 90 degrees, and FIGS. 10B to 10D are illustrations respectively taken along the lines XB—XB, XC—XC, and XD—XD and viewed from the arrow X indicated in FIG. 10A. FIG. 11 is a partially magnified view illustrating a state in which a magnetic tape lies in contact with the rotary head apparatus shown in FIG. 8. FIG. 12 is a plan view of the magnetic head shown in FIG. 9 and viewed from the Y2 direction indicated in FIG. 9.

In a rotary head apparatus 1 shown in FIG. 8, a stationery drum (not shown) is fixed, and a rotary drum 1a is rotatably supported on the stationery drum so as to be coaxial therewith and is driven to rotate by a motor power in an upper-arrow direction indicated in the figure. A magnetic tape T serving as a recording medium is wound around the rotary head apparatus 1 by a predetermined angle along a helical trajectory and runs in a lower-arrow direction indicated in the figure. All the while, the rotary drum 1a rotates, and magnetic heads H1a and H1b mounted on the rotary drum 1a scan the magnetic tape T. In the rotary head apparatus 1, a couple of the magnetic playback heads H1a and H1b are disposed so as to face each other.

The magnetic head H1a shown in FIG. 9 is formed by a base member 2 composed of an alumina titanium carbide; a playback-use, magnetic-resonance-type (MR-type) thin-film magnetic head 3; an insulating layer 4 serving as a protecting layer, both formed by a thin film forming process; and a protecting base member 5 composed of an alumina titanium carbide and bonded on the insulating layer 4 by adhering means (not shown) such as an epoxy adhesive.

A magnetic gap 6 of the MR-type thin-film magnetic head 3 is exposed to a magnetic-tape opposing surface (surface facing toward Y2 in the figure) H1aA of the magnetic head H1a. The MR-type thin-film magnetic head 3 is supplied with current through electrodes 7.

The magnetic head H1a mounted on the rotary drum 1a abuts against the magnetic tape T in a state shown in FIG. 11. Meanwhile, the X1 and X2 directions in FIG. 11 indicate the rotating direction of the rotary drum 1a and the longitudinal direction serving as the sliding direction of the magnetic tape T, respectively.

As shown in FIG. 10A, the magnetic head H1a is shaped in a convex arc having a radius of curvature R, along the longitudinal direction serving as the sliding direction of the magnetic tape T. Also, as shown in FIG. 10B, the magnetic head H1a is shaped in a convex arc having a radius of curvature r, along the lateral direction (Z1–Z2 direction indicated in FIG. 9) perpendicular to the sliding direction of the magnetic tape T.

Since the recoding and playback apparatus is of a so-called helical scanning type, as shown in FIG. 12, the magnetic gap 6 of the MR-type thin-film magnetic head 3 disposed in the magnetic head H1a is slanted at an azimuth having an angle θ corresponding to the helical trajectory.

Right and left edges 8 and 9 of the tape-opposing surface H1aA are also slanted at the same angle as that of the azimuth of the magnetic gap 6. An acute angular corner 12 formed by the right edge 8 and an upper edge 10 lies further outwards in the longitudinal direction than a corner 13 formed by the right edge 8 and a lower edge 11, and a corner 14 formed by the left edge 9 and the upper edge 10 lies further inwards in the longitudinal direction than an acute angular corner 15 formed by the left edge 9 and the lower edge 11. Thus, the plane figure of the opposing surface H1aA viewed from the magnetic tape (from the Y2 side in FIG. 9) is a parallelogram as shown in FIG. 12.

The magnetic head H1b has the same structure as that of the magnetic head H1a. However, since the magnetic head H1b is provided with an azimuth in the opposite direction to the magnetic head H1a, the plane figure of an opposing surface H1bA of the magnetic head H1b viewed from the magnetic tape is a parallelogram slanted in the opposite direction to the magnetic head H1a.

A hatched area in FIG. 12 indicates a magnetic-tape sliding area of the opposing surface H1aA in a state in which the magnetic head H1a is mounted on the rotary drum 1a and the magnetic tape slides on the opposing surface H1aA. The X1 direction in FIG. 12 indicates the longitudinal direction serving as the sliding direction of the magnetic tape T.

Japanese Unexamined Utility Model Application Publication No. 62-018812 has disclosed a magnetic head shaped in two convex arcs, one having the curvature of radius R along the sliding direction of a magnetic, and the other having the curvature of radius r along a direction perpendicular to the sliding direction.

As mentioned previously, the magnetic head H1a is formed such that the plane figure of the opposing surface H1aA viewed from the magnetic tape is a parallelogram. Accordingly, when the opposing surface H1aA is shaped in a convex arc having the curvature of radius r along the lateral direction, the apex of the convex arc having the curvature of radius r is likely formed toward the acute angular corners 12 and 15; as a result, a continuous line PL1 formed by the apex becomes a curve extending towards the acute angular corners 12 and 15, as shown by a dotted line in FIG. 12.

That is, in an area from the magnetic gap 6 to the right edge 8, as the apex of the convex arc having the curvature of radius r comes closer to the acute angular corner 12, the apex is displaced further away from the center line O—O laterally dividing the opposing surface H1aA into two parts, towards the upper edge 10, and, on the right edge 8, the apex is formed at substantially the same position as the acute angular corner 12.

For example, as shown in FIG. 10B, in the illustration taken along the center line XB—XB longitudinally dividing the magnetic head H1a into two parts and viewed from the X direction, the apex P1 lies on substantially the same line as the center line XB—XB. Also, as shown in FIG. 10C, in the illustration taken along the line XC—XC lying closer to the right edge 8 than the center line XB—XB and viewed from the X direction, the apex P2 lies at a position displaced away from the center line O—O towards the upper edge 10.

Meanwhile, in an area from the magnetic gap 6 to the left edge 9, as the apex of the convex arc having the curvature of radius r comes closer to the acute angular corner 15, the apex is displaced further away from the center line O—O towards the lower edge 11, and, on the left edge 19, the apex is formed at substantially the same position as the acute angular corner 15.

For example, as shown in FIG. 10D, in the illustration taken along the line XD—XD lying closer to the left edge 9 than the center line XB—XB and viewed from the X direction, the apex P3 lies at a position displaced away from the center line O—O towards the lower edge 11.

Meanwhile, since the magnetic head H1b is provided with an azimuth in an opposite direction to the magnetic head H1a, the displacement of the continuous line PL1 away from the center line O—O is symmetrical to the magnetic head H1a with respect to the center line O—O.

Accordingly, when the magnetic tape T comes into contact with and slides on the magnetic-tape sliding area of the opposing surface H1aA, in two areas L1 where the continuous line PL1 is displaced away from the center line O—O, the continuous line PL1 abuts against the magnetic tape T while having an angle generated in accordance with the displacement away from the center line O—O, thereby causing the continuous line PL1 to generate a sliding resistance against the magnetic tape T and resultantly scraping magnetic powder applied on the magnetic tape T. The scraped magnetic powder is conveyed to the magnetic gap 6 associated with the running of the magnetic tape T and is deposited between the magnetic tape T and the MR-type thin-film magnetic head 3 disposed in the magnetic gap 6. When the magnetic powder is deposited as mentioned above, a so-called spacing loss occurs, thereby leading to a reduced output. As a result, a servo characteristic deteriorates, for example, a servo mechanism becomes unstable, and an error is unlikely detected. This applies also to the magnetic head H1b.

Especially when the magnetic tape T is stopped and scanned, for example, for playing back a still picture, the magnetic powder of the magnetic tape T is likely scraped.

SUMMARY OF THE INVENTION

The present invention has been made so as to solve the above-mentioned problems. Accordingly, it is an object of the present invention to provide a recording and playback apparatus in which a recording medium such as a magnetic tape is unlikely scraped, a decrease in output and deterioration in a servo characteristic due to a spacing loss are unlikely to occur, and an error is easily detected.

A rotary head apparatus according to the present invention includes a rotary drum whose outer circumferential surface serves as a sliding surface relative to a recording medium; and at least one magnetic head lying on the sliding surface of the rotary drum. The magnetic head includes base members juxtaposed along a sliding direction relative to the recording medium; and a playback magnetic element disposed between the base members and slanted at a predetermined azimuth angle with respect to the sliding direction. A recording-medium opposing surface of the magnetic head is wider in a longitudinal direction serving as the sliding direction than in a lateral direction perpendicular to the longitudinal direction. The opposing surface is curved in two convex shapes extending towards the outside of the rotary drum, one along the longitudinal cross section of the magnetic head extending across the center line of the magnetic head laterally dividing the magnetic head into two parts, and the other along the lateral cross section of the magnetic head orthogonal to the center line. Also, the opposing surface is formed such that the apex of the lateral cross section is gradually displaced from the center line as distancing itself from the center of the opposing surface in the longitudinal direction and is gradually displaced from the center line in the opposite direction to the above displacement as distancing itself from the center in the reverse longitudinal direction. In addition, the opposing surface is formed such that the two displacements of the apex laterally away from the center line in the sliding area of the opposing surface with the recording medium are respectively at most 2 μm.

In the rotary head apparatus according to the present invention, the recording-medium opposing surface of the magnetic head is curved in two convex shapes extending towards the outside of the rotary drum, one along the longitudinal cross section extending across the center line laterally dividing the magnetic head into two parts so as to be orthogonal to the longitudinal direction in which the recording medium slides, the other along the lateral cross section orthogonal to the center line. Also, the apex of the lateral cross section is gradually displaced from the center line as distancing itself from the center of the opposing surface in the longitudinal direction and is gradually displaced from the center line in the opposite direction to the above displacement as distancing itself from the center in the reverse longitudinal direction. In addition, the opposing surface is formed such that the two displacements of the apex laterally away from the center line in the sliding area of the opposing surface with the recording medium are respectively at most 2 µm. With this structure, when the recording medium abuts against and slides on the opposing surface, since the displacements of the apex from the center line are very small in the sliding area, a sliding resistance of the apex exerted on the recording medium in the area where the displacement occurs can be reduced; as a result, the surface of the recording medium is unlikely scraped. Hence, the amount of a part of a scraped portion of the recording medium, deposited between the recording medium and the playback magnetic element, can be decreased, thereby preventing a so-called spacing loss and a decrease in output. Accordingly, deterioration in a servo characteristic is prevented, an error is easily detected, and deterioration in an error-detection characteristic is also prevented.

In this case, the rotary head apparatus may have a structure in which the opposing surface has a pair of long sides extending in the longitudinal direction and being parallel to each other; a pair of short sides slanted at the same angle as the azimuth angle and being parallel to each other; and a pair of acute angular corners formed by the long sides and the short sides, and also in which the apex is displaced from the center line and comes closer to either of the corners as distancing itself from the center of the opposing surface.

When the opposing surface has the pair of short sides slanted at the same angle as the azimuth angle and being parallel to each other, the apex is likely to come closer to either of the two corners and to be displaced away from the center line as distancing itself from the center of the opposing surface. Even in this case, the displacement of the apex away from the center line can be made very small, thereby preventing a decrease in output.

Also, a magnetic playback apparatus according to the present invention includes the rotary head apparatus according to the present invention. When the recording medium is wound around the circumferential surface of the rotary drum by a predetermined angle, and the rotary drum of the rotary head apparatus is driven to rotate, the magnetic head slides on the recording medium as the recording medium moves in the longitudinal direction, and the magnetic head thus reads magnetic information at least recorded in the recording medium.

DESCRIPTION OF THE PREFERRED EMBODIMENTS

Figure 1:
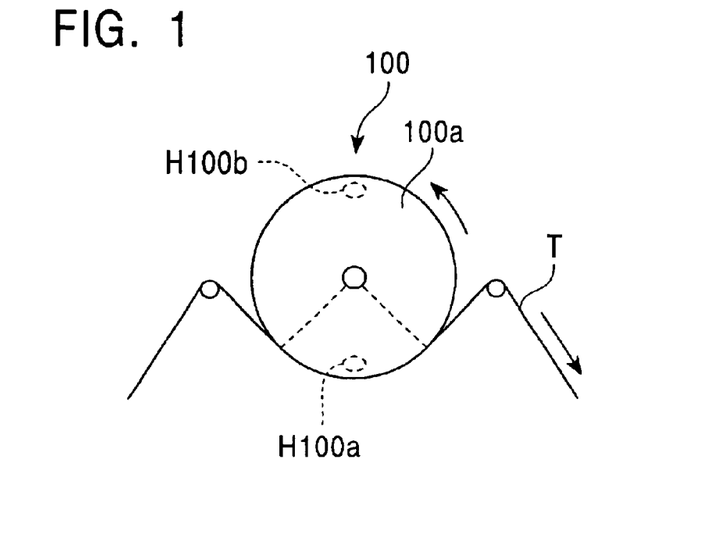
FIG. 1 is a plan view of a rotary head apparatus an embodiment of the present invention.
Figure 2:
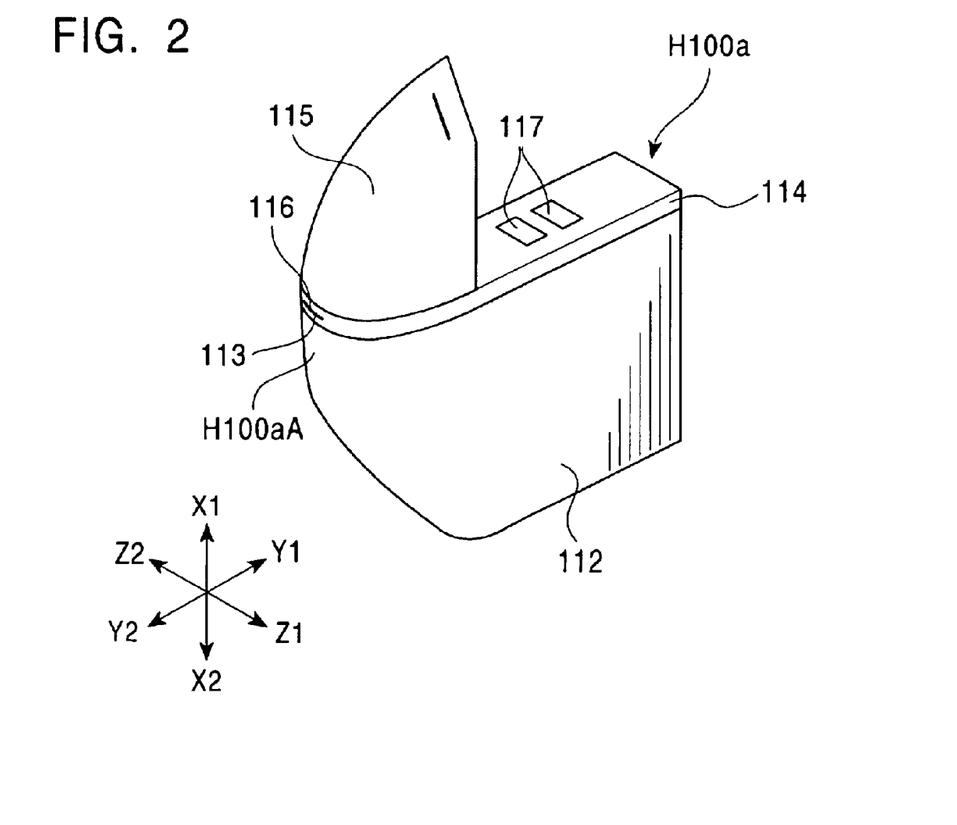
FIG. 2 is a perspective view of an example magnetic head mounted on the rotary head apparatus shown in FIG. 1.
Figure 3A:
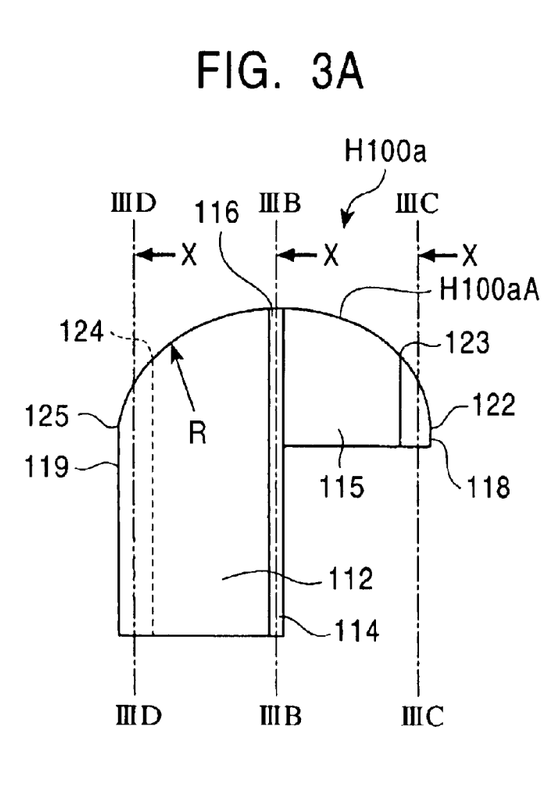
FIG. 3A is a plan view of the magnetic head shown in FIG. 2, viewed from the Z1 direction indicated in FIG. 2 and rotated clockwise by 90 degrees.
Figure 3B:
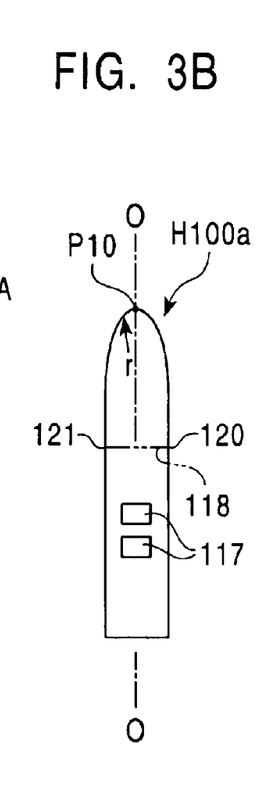
FIGS. 3B to 3D are illustrations respectively taken along the lines IIIB—IIIB, IIIC—IIIC, and IIID—IIID and viewed from the arrow X indicated in FIG. 3A.
Figure 3C:
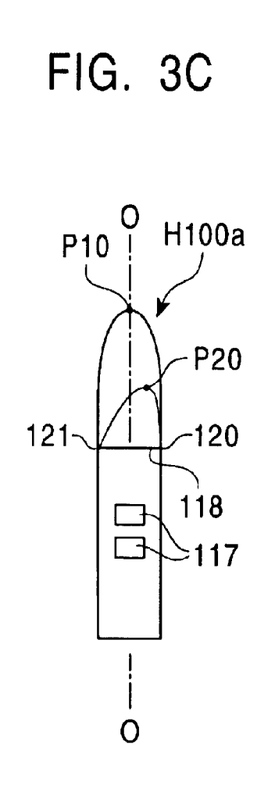
Figure 3D:
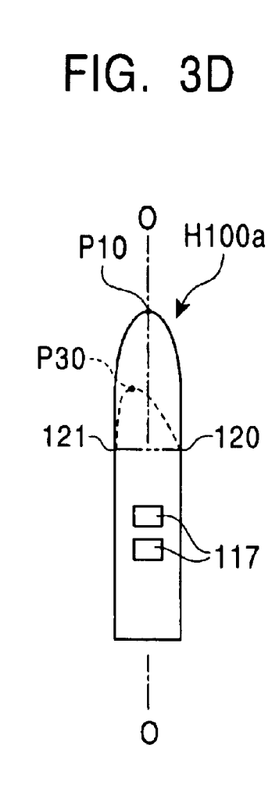
Figure 4:
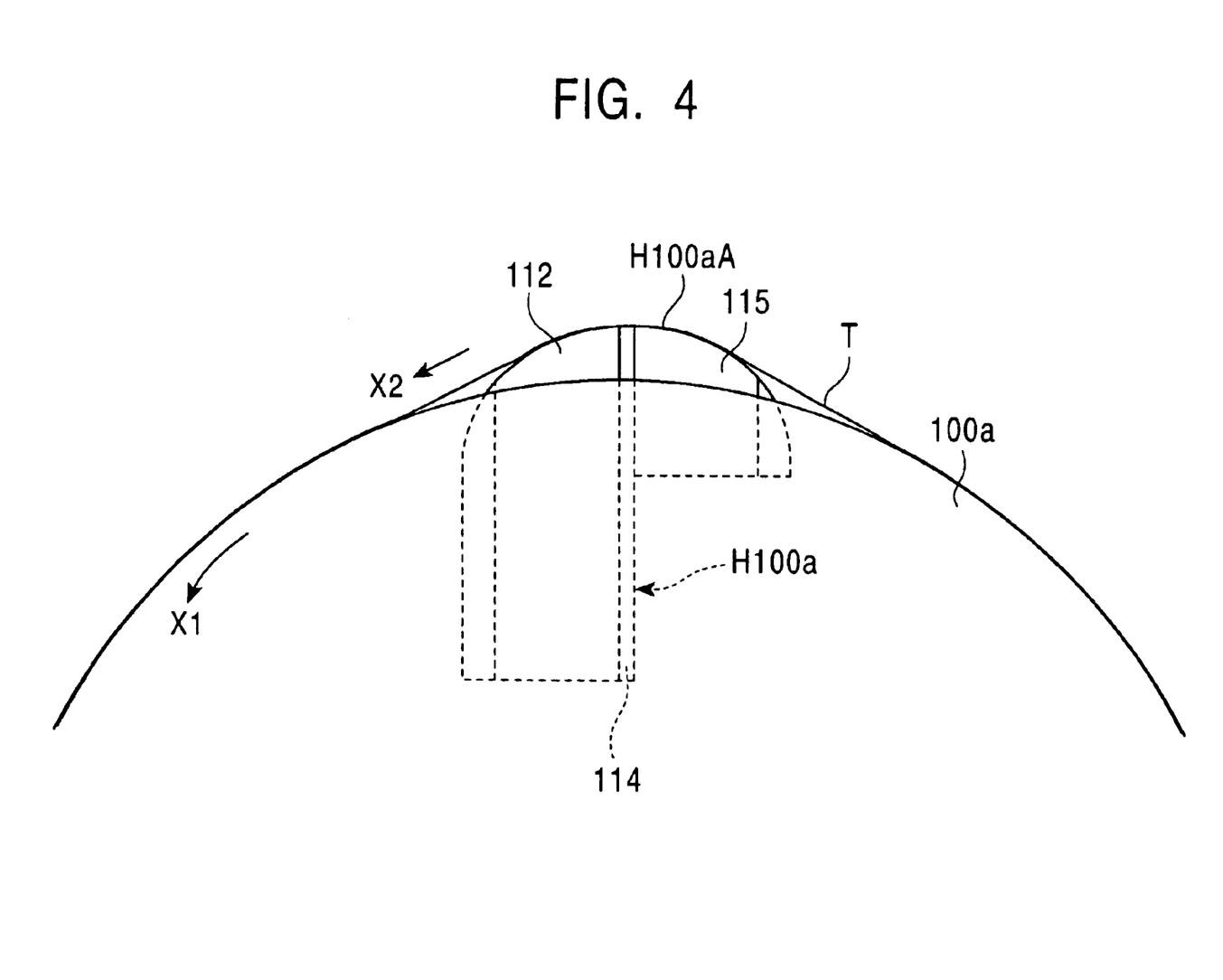
FIG. 4 is a partially magnified view illustrating a state in which a magnetic tape lies in contact with the rotary head apparatus shown in FIG. 1.
Figure 5:
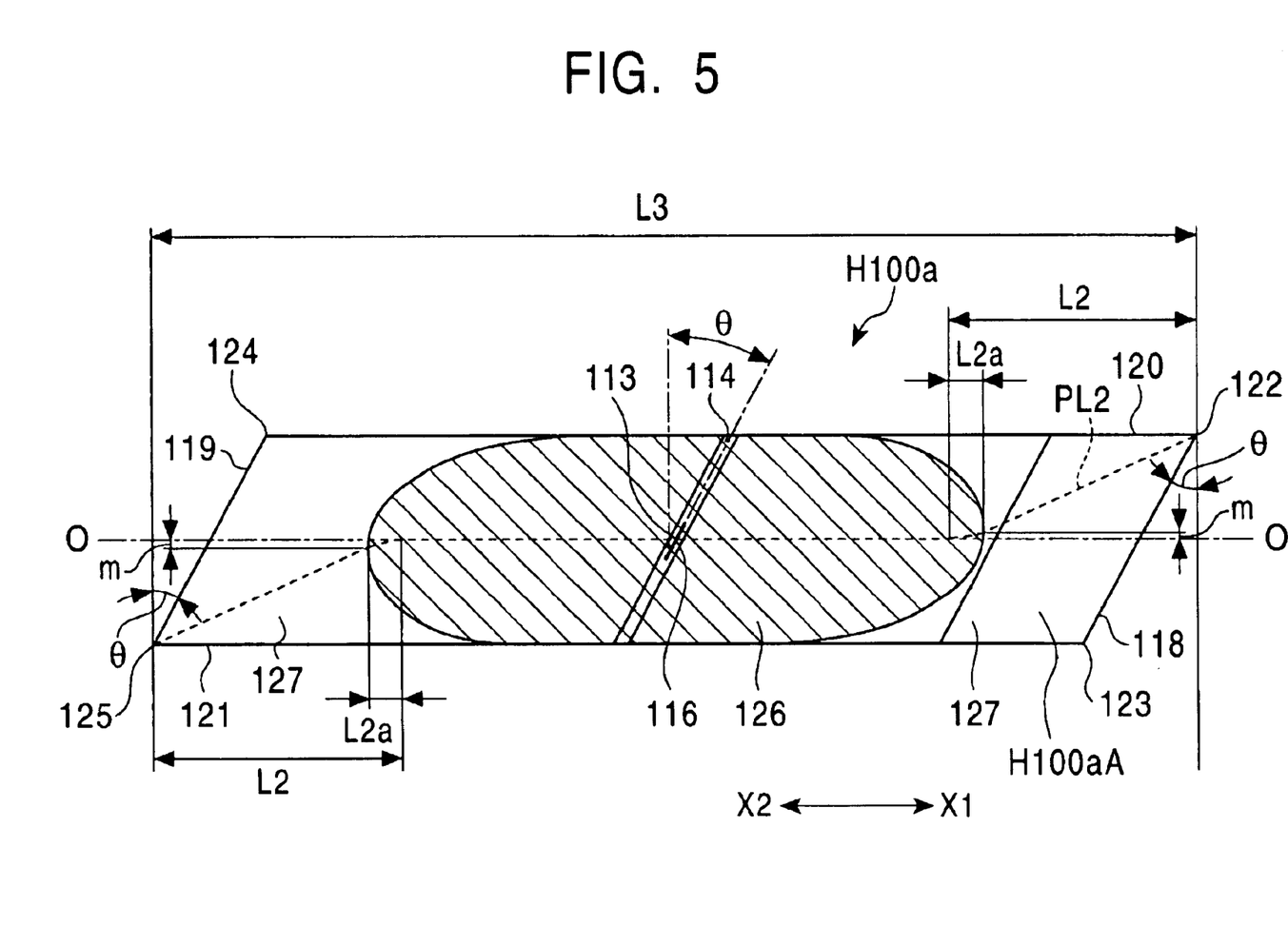
FIG. 5 is a plan view of the magnetic head shown in FIG. 2 and viewed from the Y2 direction indicated in FIG. 2.

FIG. 1 is a plan view of a rotary head apparatus having magnetic heads mounted thereon. FIG. 2 is a perspective view of an example magnetic head mounted on the rotary head apparatus. FIG. 3A is a plan view of the magnetic head shown in FIG. 2, viewed from the Z1 direction indicated in FIG. 2 and rotated clockwise by 90 degrees, and FIGS. 3B to 3D are illustrations respectively taken along the lines IIIB—IIIB, IIIC—IIIC, and IIID—IIID and viewed from the arrow X indicated in FIG. 3A. FIG. 4 is a partially magnified view illustrating a state in which a magnetic tape lies in contact with the rotary head apparatus shown in FIG. 1. FIG. 5 is a plan view of the magnetic head shown in FIG. 2 and viewed from the Y2 direction indicated in FIG. 2.

A rotary head apparatus 100 shown in FIG. 1 is mounted on a magnetic recording and playback apparatus for use in video equipment or on a magnetic playback apparatus such as a magnetic recording and playback apparatus for saving computer data. In the rotary head apparatus 100, a stationery drum (not shown) is fixed, and a rotary drum 100a is rotatably supported on the stationery drum so as to be coaxial therewith and is driven to rotate by a motor power in an upper-arrow direction indicated in the figure. A magnetic tape T serving as a recording medium is wound around the rotary head apparatus 100 by a predetermined angle along a helical trajectory and runs in a lower-arrow direction indicated in the figure. All the while, the rotary drum 100a rotates and magnetic heads H100a and H100b mounted on the rotary drum 100a scan the magnetic tape T. In the rotary head apparatus 100, a couple of the magnetic playback heads H100a and H100b are disposed so as to face each other.

The magnetic heads H100a and H100b are provided with azimuth angles in the opposite direction to each other. With this arrangement, of two recording tracks of the magnetic tape T having data recorded at the different azimuth angles, the magnetic head H100a reads data in an R channel (Rch) recorded at one azimuth angle and the magnetic head H100b reads data in an L channel (Lch) recorded at the other azimuth angle.

The magnetic head H100a mounted on the rotary drum 100a abuts against the magnetic tape T in a state shown in FIG. 4. Meanwhile, the X1 and X2 directions in FIG. 4 indicate the rotating direction of the rotary drum 100a and the longitudinal direction serving as the sliding direction of the magnetic tape T, respectively. This applies also to the magnetic head H100b.

The magnetic head H100a shown in FIG. 2 is formed by a base member 112 composed of an alumina titanium carbide; a playback-use, MR-type thin-film magnetic head 113; an insulating layer 114 serving as a protecting layer, both formed by a thin film forming process; and a protecting base member 115 composed of an alumina titanium carbide and bonded on the insulating layer 114 by adhering means (not shown) such as an epoxy adhesive.

A magnetic gap 116 of the MR-type thin-film magnetic head 113 is exposed to a magnetic-tape opposing surface (surface facing toward Y2 in the figure) H100aA of the magnetic head H100a. As shown in FIG. 5, the MR-type thin-film magnetic head 113 is disposed such that the center line laterally (i.e., towards the Z1–Z2 direction in FIG. 2) dividing the MR-type thin-film magnetic head 113 into two parts so as to be orthogonal to the longitudinal direction lies on the center line O—O laterally dividing the magnetic head H100a into two parts.

The MR-type thin-film magnetic head 113 is supplied with current through electrodes 117.

As shown in FIG. 3A, the magnetic head H100a is shaped in a convex arc having a radius of curvature R, along the longitudinal direction. Also, as shown in FIG. 3B, the magnetic head H100a is shaped in a convex arc having a radius of curvature r, along the lateral direction.

Since the rotary head apparatus is of a so-called helical scanning type, as shown in FIG. 5, the magnetic gap 116 of the MR-type thin-film magnetic head 113 disposed in the magnetic head H100a is provided with an azimuth having an angle θ corresponding to the helical trajectory.

Right and left edges 118 and 119 of the tape-opposing surface H100aA are also slanted at the same angle as that of the azimuth of the magnetic gap 116. An acute angular corner 122 formed by the right edge 118 and an upper edge 120 lies further outwards in the longitudinal direction than a corner 123 formed by the right edge 118 and a lower edge 121, and a corner 124 formed by the left edge 119 and the upper edge 120 lies further inwards in the longitudinal direction than an acute angular corner 125 formed by the left edge 119 and the lower edge 121. Thus, the plane figure of the opposing surface H100aA viewed from the magnetic tape (from the Y2 side in FIG. 2) is a parallelogram as shown in FIG. 5.

A hatched area in FIG. 5 indicates a first area 126 serving as a magnetic-tape sliding area of the opposing surface H100aA in a state in which the magnetic head H100a is mounted on the rotary drum 100a and the magnetic tape slides on the opposing surface H100aA. Also, non-hatched area indicates second areas 127 where no magnetic tape slides. The X1 direction in FIG. 5 indicates the sliding direction of the magnetic tape T.

The magnetic head H100a is formed such that the plane figure of the opposing surface H100aA viewed from the magnetic tape is a parallelogram. Accordingly, when the opposing surface H100aA is shaped in a convex arc having the curvature of radius r along the lateral direction, the apex of the convex arc having the curvature of radius r is likely formed towards the acute angular corners 122 and 125; as a result, a continuous line PL2 formed by the apex becomes a curve extending towards the acute angular corners 122 and 125, as shown by a dotted line in FIG. 5.

That is, as shown in FIG. 5, in an area from the magnetic gap 116 to the right edge 118, as the apex of the convex arc having the curvature of radius r comes closer to the acute angular corner 122, the apex is displaced further away from the center line O—O laterally dividing the opposing surface H100aA into two parts, towards the upper edge 120, and, on the right edge 118, the apex is formed at substantially the same position as the acute angular corner 122.

For example, as shown in FIG. 3B, in the illustration taken along the center line IIIB—IIIB longitudinally dividing the magnetic head H100a into two parts and viewed from the X direction, the apex denoted by P10 lies on substantially the same line as the center line IIIB—IIIB. Also, as shown in FIG. 3C, in the illustration taken along the line IIIC—IIIC lying closer to the right edge 118 than the center line IIIB—IIIB and viewed from the X direction, the apex denoted by P20 lies at a position displaced away from the center line O—O towards the upper edge 120.

Meanwhile, in an area of the opposing surface ranging from the magnetic gap 116 to the left edge 119, as the apex of the convex arc having the curvature of radius r comes closer to the acute angular corner 125, the apex is displaced further away from the center line O—O towards the lower edge 121, and, on the left edge 119, the apex is formed at substantially the same position as the acute angular corner 125.

For example, as shown in FIG. 3D, in the illustration taken along the line IIID—IIID lying closer to the left edge 119 than the center line IIIB—IIIB and viewed from the X direction, the apex denoted by P30 lies at a position displaced away from the center line O—O towards the lower edge 121.

As shown in FIG. 5, in the rotary head apparatus 100 including the rotary drum 110a having the magnetic head H100a mounted thereon, the displacement m of the continuous line PL2 relative to the center line O—O in the first area 126, produced when the magnetic tape T slides on the opposing surface H100aA, is smaller than that in the second areas 127.

Meanwhile, the magnetic head H100b has the same structure as that of the magnetic head H100a. However, since the magnetic head H100b is provided with an azimuth in the opposite direction to the magnetic head H100a, the plane figure of an opposing surface H100bA of the magnetic head H100b viewed from the magnetic tape is a parallelogram slanted in the opposite direction to the magnetic head H100a. Also, the displacement of the continuous line PL2 away from the center line O—O is symmetrical to the magnetic head H100a with respect to the center line O—O.

When each of the lengths of the tape opposing surfaces H100aA and H100bA of the magnetic heads H100a and H100b in the tape sliding direction increase or each of the distances of the opposing surfaces H100aA and H100bA protruding from the rotary drum 100a towards the magnetic tape T decrease, the displacement m of the continuous line PL2 relative to the center line O—O in the second areas 127 becomes smaller.

Figure 6:
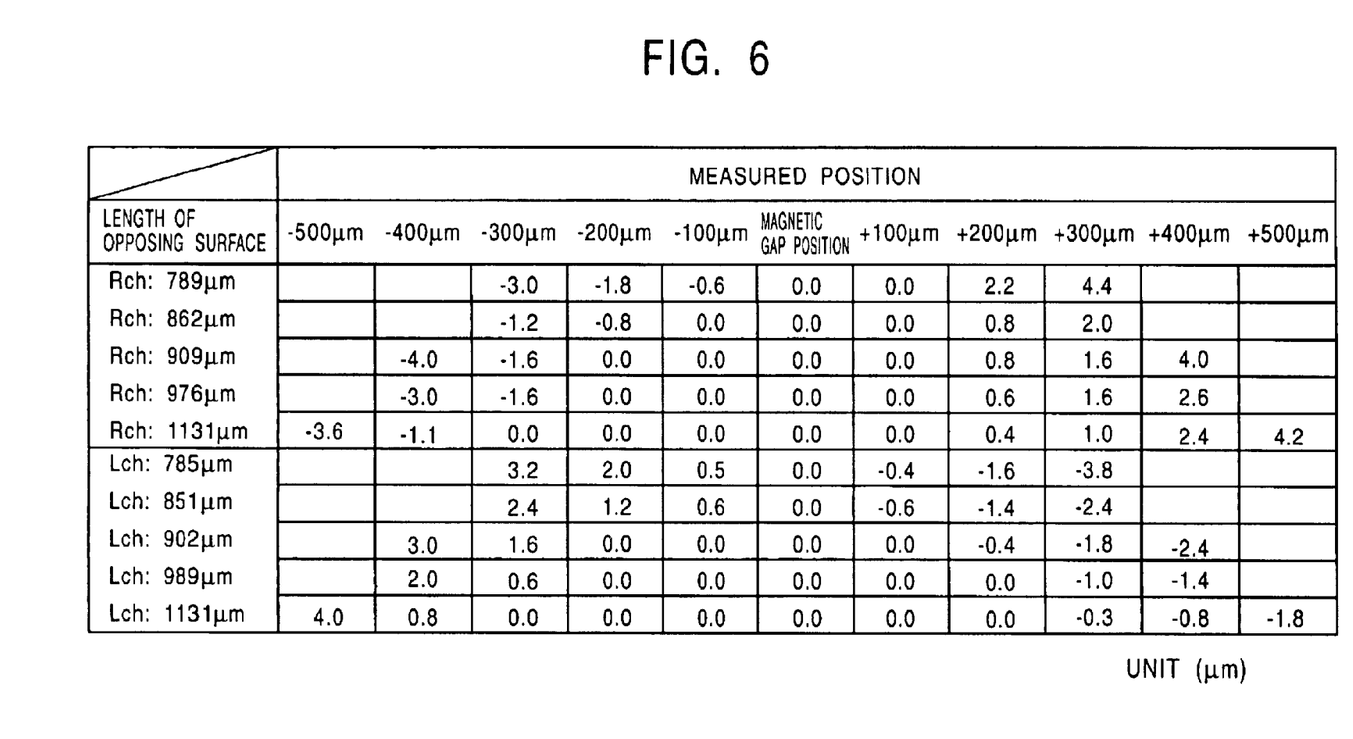
FIG. 6 is a table illustrating the relationship between length of an opposing surface and displacement of an apex of each magnetic head.
Figure 7:
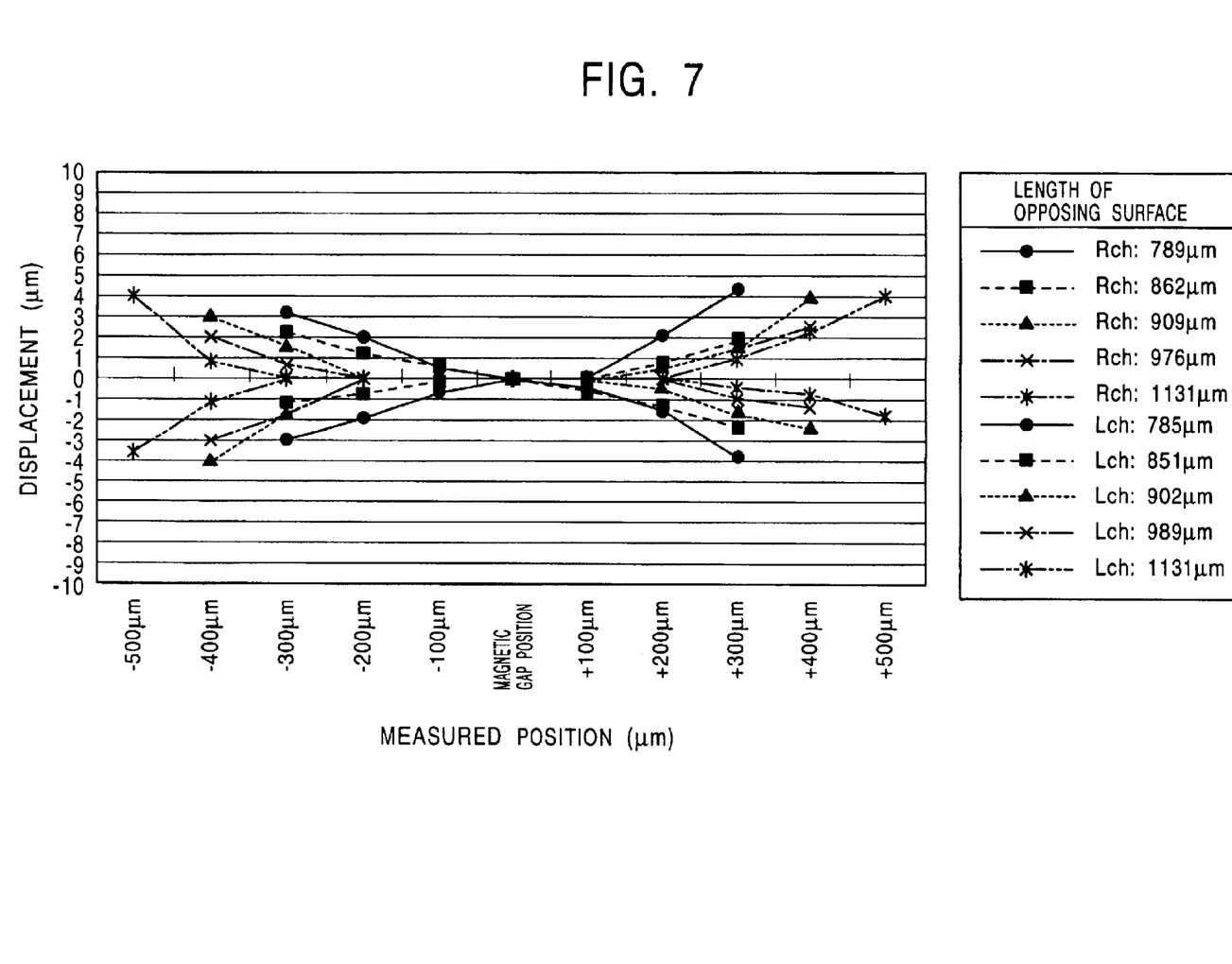
FIG. 7 is a graph based on the data in FIG. 6.

For example, as shown in FIGS. 6 and 7, areas of the opposing surface where the continuous line PL2 is displaced away from the center line O—O are formed away from the magnetic gap 116 of the MR-type thin-film magnetic head 113.

FIG. 6 is a table illustrating the relationship between the length (length L3 in FIG. 5) from one acute angular corner to the other angular corner of the opposing surface and the displacement of the apex of each magnetic head, and FIG. 7 is a graph based on the data in FIG. 6. In FIGS. 6 and 7, Rch and Lch respectively denote the magnetic heads H110a and H100b mounted on the rotary head apparatus 100, and measured values were obtained by using the magnetic heads, each having a structure in which the curvatures of radius R and r of the two convex arcs are respectively 5 mm and 1.5 mm, and the azimuth angle is 25 degrees.

Each displacement m shown in FIG. 6 was measured at a position lying away from the magnetic gap by a predetermined length with respect to the magnetic gap of each magnetic head.

As can be seen from FIG. 6, the displacement m at a position lying away from the magnetic gap by a predetermined length decreases as the length of the opposing surface increases. That is, as the length of the opposing surface increases, an area of the opposing surface where the displacement occurs tends to lie away from the magnetic gap.

As described above, in the magnetic heads H100a and H100b, respective areas of the opposing surfaces where the corresponding displacements occur tend to lie further away from the corresponding magnetic gaps as the lengths of the opposing surfaces H100aA and H100bA become greater in the tape sliding direction. The recording and playback apparatus according to the present invention is constructed such that, for example, by adjusting the lengths of the opposing surfaces H100aA and H100bA, when the magnetic tape T is wound around the rotary head apparatus 100 including the rotary drum 100a having the magnetic head H100a and H100b mounted thereon and is driven to run, the magnetic tape T does not slide in the respective second areas where the displacements of the apexes away from the corresponding center lines O—O are great and it slides only in the respective first areas where the displacements are small. With this structure, when the magnetic head H100a shown in FIG. 5 is taken into account by way of example and when the magnetic tape T slides in the first area 126, of two areas L2 where the displacement occurs, only areas L2a where the displacement is small abut against and slide on the magnetic tape, thereby reducing the sliding resistance of the apex exerted on the magnetic tape T. With this structure, since magnetic powder applied on the magnetic tape T is prevented from being scraped, the scraped magnetic powder is unlikely to be conveyed to the magnetic gaps 116 associated with the running of the magnetic tape T and to be deposited between the magnetic tape and the MR-type thin-film magnetic head 113 disposed in the magnetic gap 116. Thus, a so-called spacing loss and a decrease in output can be prevented.

In addition, the rotary head apparatus 100 according to the present invention is constructed such that the displacement m is equal to 2 $\mu$m or less. When the displacement m is greater than 2 $\mu$m, an output decreases by that much; as a result, a servo characteristic deteriorates, for example, a servo mechanism becomes unstable, and an error is unlikely detected. However, in the rotary head apparatus according to the present invention, since the displacement m is equal to 2 $\mu$m or less, the servo characteristic is prevented from being deteriorated, for example, the servo mechanism is prevented from becoming unstable, and also an error is easily detected.

Although the above-described rotary head apparatus mounted on the magnetic playback apparatus includes the rotary drum 100a having the couple of magnetic playback heads H100a and H100b mounted thereon by way of example, the present invention is not limited to the above structure. The rotary drum 100a may have a single magnetic head or more than two magnetic heads mounted thereon. Also, the rotary drum 100a may have a magnetic writing head and/or a magnetic erasing head mounted thereon in place of the magnetic playback heads H100a and H100b. In this case, it is preferable that each of magnetic-tape opposing surfaces of the magnetic writing head and the magnetic erasing head be shaped in convex arcs having the predetermined curvatures of radius R and r respectively along the longitudinal direction serving as the sliding direction of the magnetic tape and along the lateral direction perpendicular to the longitudinal direction, and also that the apex lying in the first area, of the convex arc having the curvature of radius r, be positioned in the lateral direction within 2 $\mu$m from the center line laterally dividing the magnetic head into two parts. With this structure, the magnetic tape is unlikely scraped by the magnetic writing or erasing head.

Also, although the magnetic head is formed only by the MR-type thin-film magnetic heads 113 by way of example, the present invention is not limited to the above structure. For example, the magnetic heads may be formed not only by an interactive head but also by the MR-type thin-film magnetic head 113. In this case, the interactive head is disposed along the longitudinal direction with respect to the MR-type thin-film magnetic head 113. With this structure, a single magnetic head can perform not only writing data but also playing it back.

In this case, a magnetic gap of the interactive head is also exposed to the opposing surface of the magnetic head, and the center line laterally dividing the interactive head into two parts lies on the center line O—O laterally dividing the magnetic head into two parts.

Also, the magnetic head mounted on the rotary head apparatus may be a so-called bulk-type, recording and playback magnetic head having a structure in which a pair of core half-bodies composed of high-permeability magnetic material such as ferrite are combined so as to face each other along their opposing surfaces opposed to the magnetic tape T, and the core half-bodies have a magnetic material layer serving as a magnetic gap, interposed between the opposing portions thereof.

In the rotary head apparatus 100 according to the present invention including the rotary drum 100a having the magnetic heads H100a and H100b mounted thereon, when the magnetic tape T is wound around the rotary head apparatus 100 and is driven to run, the magnetic tape T does not slide in the second areas where the displacement of the apex of the convex arc having the curvature of radius r away from the center line O—O is great and the magnetic tape slides only in the first area where the displacement is small. Also, the displacement of the apex in the first area is arranged within the 2 µm. With this structure, the sliding resistance of the apex exerted on the magnetic tape T can be reduced, whereby a so-called spacing loss can be reduced and a decrease in output can be prevented. Also, deterioration in the servo characteristic can be prevented, and an error-detection characteristic can be improved.

What is claimed is:

1. A rotary head apparatus, comprising:

a rotary drum whose outer circumferential surface serves as a sliding surface relative to a recording medium; and at least one magnetic head lying on the sliding surface of the rotary drum, wherein the magnetic head comprises base members juxtaposed along a sliding direction relative to the recording medium; and a playback magnetic element disposed between the base members and slanted at a predetermined azimuth angle with respect to the sliding direction, wherein a recording-medium opposing surface of the magnetic head is wider in a longitudinal direction serving as the sliding direction than in a lateral direction perpendicular to the longitudinal direction, wherein the opposing surface is curved in two convex shapes extending towards an outside of the rotary drum, one along a longitudinal cross section of the magnetic head extending across a center line of the magnetic head laterally dividing the magnetic head into two parts, and the other along a lateral cross section of the magnetic head orthogonal to the center line, and the opposing surface is formed such that an apex of the lateral cross section is gradually displaced in a first displacement from the center line with increasing distance from the center of the opposing surface in the longitudinal direction and is gradually displaced from the center line in the opposite direction to the first displacement in a second displacement with increasing distance from the center in a reverse longitudinal direction, and wherein the opposing surface is formed such that the first and second displacements of the apex laterally away from the center line in a sliding area of the opposing surface with the recording medium are respectively at most 2 µm.

2. The rotary head apparatus to claim 1, wherein the opposing surface has a pair of long sides extending in the longitudinal direction and being parallel to each other; a pair of short sides slanted at the same angle as an azimuth angle and being parallel to each other; and a pair of acute angular corners formed by the long sides and the short sides, and wherein the apex is displaced from the center line and comes closer to either of the corners with increasing distance from the center of the opposing surface.

3. A magnetic playback apparatus, comprising the rotary head apparatus according to claim 1, wherein, when the recording medium is wound around a circumferential surface of the rotary drum by a predetermined angle, and the rotary drum of the rotary head apparatus is driven to rotate, the magnetic head slides on the recording medium as the recording medium moves in the longitudinal direction, and the magnetic head thus reads magnetic information at least recorded in the recording medium.

4. The magnetic playback apparatus, comprising the rotary head apparatus according to claim 2, wherein, when the recording medium is wound around a circumferential surface of the rotary drum by a predetermined angle, and the rotary drum of the rotary head apparatus is driven to rotate, the magnetic head slides on the recording medium as the recording medium moves in the longitudinal direction, and the magnetic head thus reads magnetic information at least recorded in the recording medium.

* * * * *